March 24, 1925.  1,531,129

H. A. PEDRICK
BORING UNIT
Filed June 23, 1921  3 Sheets-Sheet 1

Inventor-
Howard A. Pedrick
by his Attorneys.
Howson & Howson

March 24, 1925.                                            1,531,129
H. A. PEDRICK
BORING UNIT
Filed June 23, 1921        3 Sheets-Sheet 2
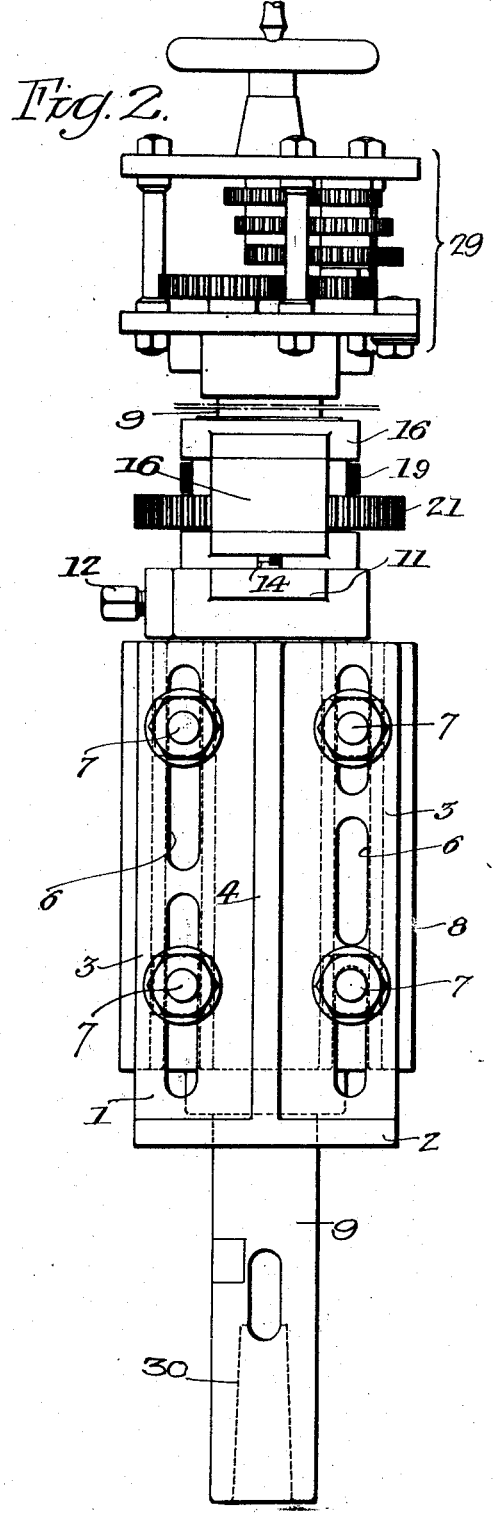
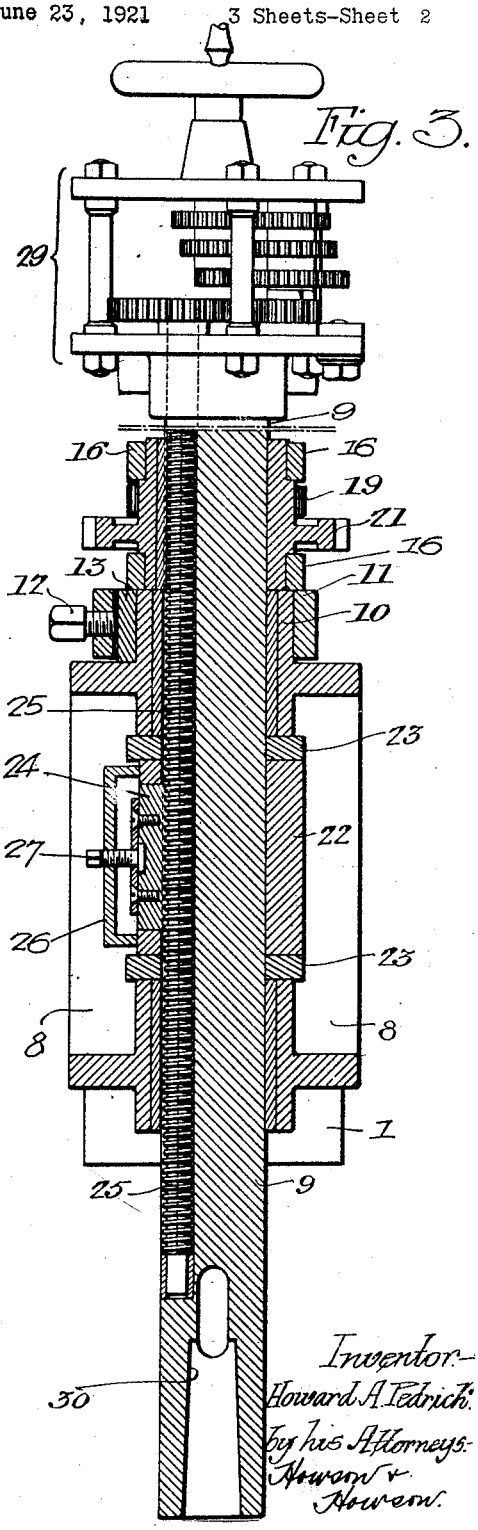

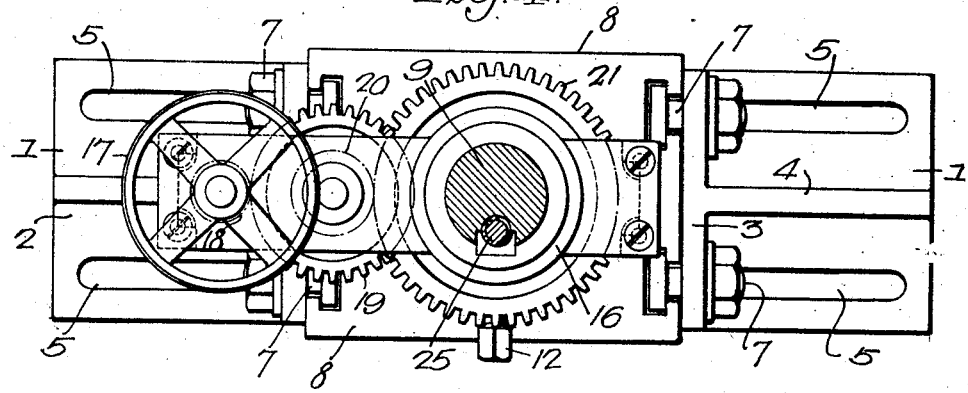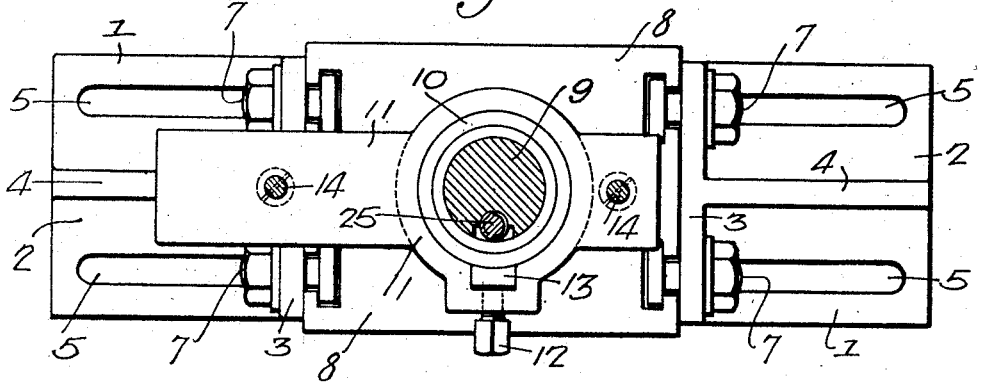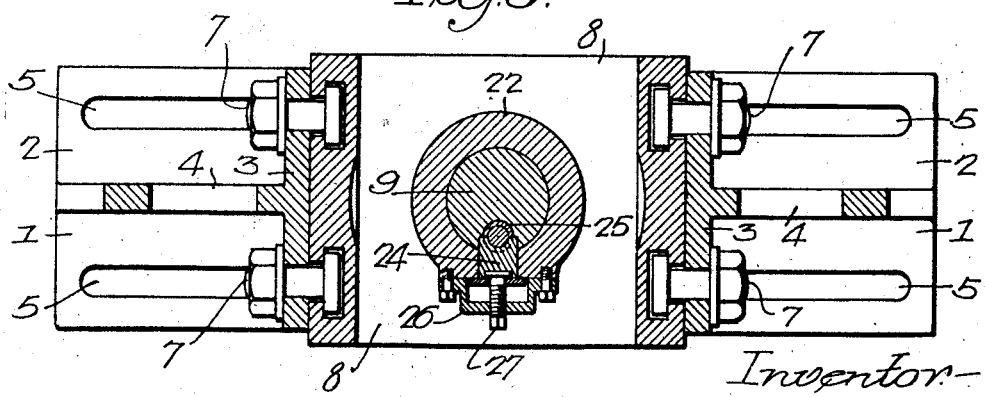

Patented Mar. 24, 1925.

1,531,129

UNITED STATES PATENT OFFICE.

HOWARD A. PEDRICK, OF BALA, PENNSYLVANIA, ASSIGNOR TO HIMSELF AND ALBERT D. PEDRICK, COPARTNERS TRADING AS PEDRICK TOOL AND MACHINE COMPANY.

BORING UNIT.

Application filed June 23, 1921. Serial No. 479,837.

*To all whom it may concern:*

Be it known that I, HOWARD A. PEDRICK, a citizen of the United States, residing in Bala, Montgomery County, Pennsylvania, have invented the Boring Unit, of which the following is a specification.

This invention relates to that class of devices particularly designed for boring the interiors of cylindrical structures as well as for drilling, reaming and similar operations and one object thereof is to provide a novel structure for adjustably supporting a power driven boring bar, whereby this may be quickly and conveniently mounted on or adjacent the structure to be operated on, in such position as to perform the work required.

It is further desired to provide a boring bar with a supporting structure particularly adapted to serve as a means for carrying the gearing or other driving mechanism or device for actuating said bar, and the arrangement of parts is such as to permit of the quick and convenient adjustment of said mechanism on the supporting structure in order to best suit it for connection to the driving motor, shaft, or other device by or through which power is supplied.

Another object of my invention is to provide a device of the character noted which shall include a novel construction and arrangement of feed nut for cooperating with the feed screw which controls the feed or longitudinal movement of the boring bar, the arrangement being such as to permit of the convenient and quick adjustment of said nut for the purpose of freeing it at will from the said screw in order to permit of the rapid longitudinal movement of the boring bar either by hand or otherwise.

These objects and other advantageous ends I attain as hereinafter set forth, reference being had to the accompanying drawings, in which, Figs. 1 and 2 are respectively a plan and a side elevation of a boring machine or unit constructed in accordance with my invention;

Fig. 3 is a longitudinal section on the line 3—3, Fig. 1;

Figs. 4, 5 and 6 are transverse vertical sections taken respectively on the lines, 4—4, 5—5, and 6—6, Fig. 1.

Figure 1:
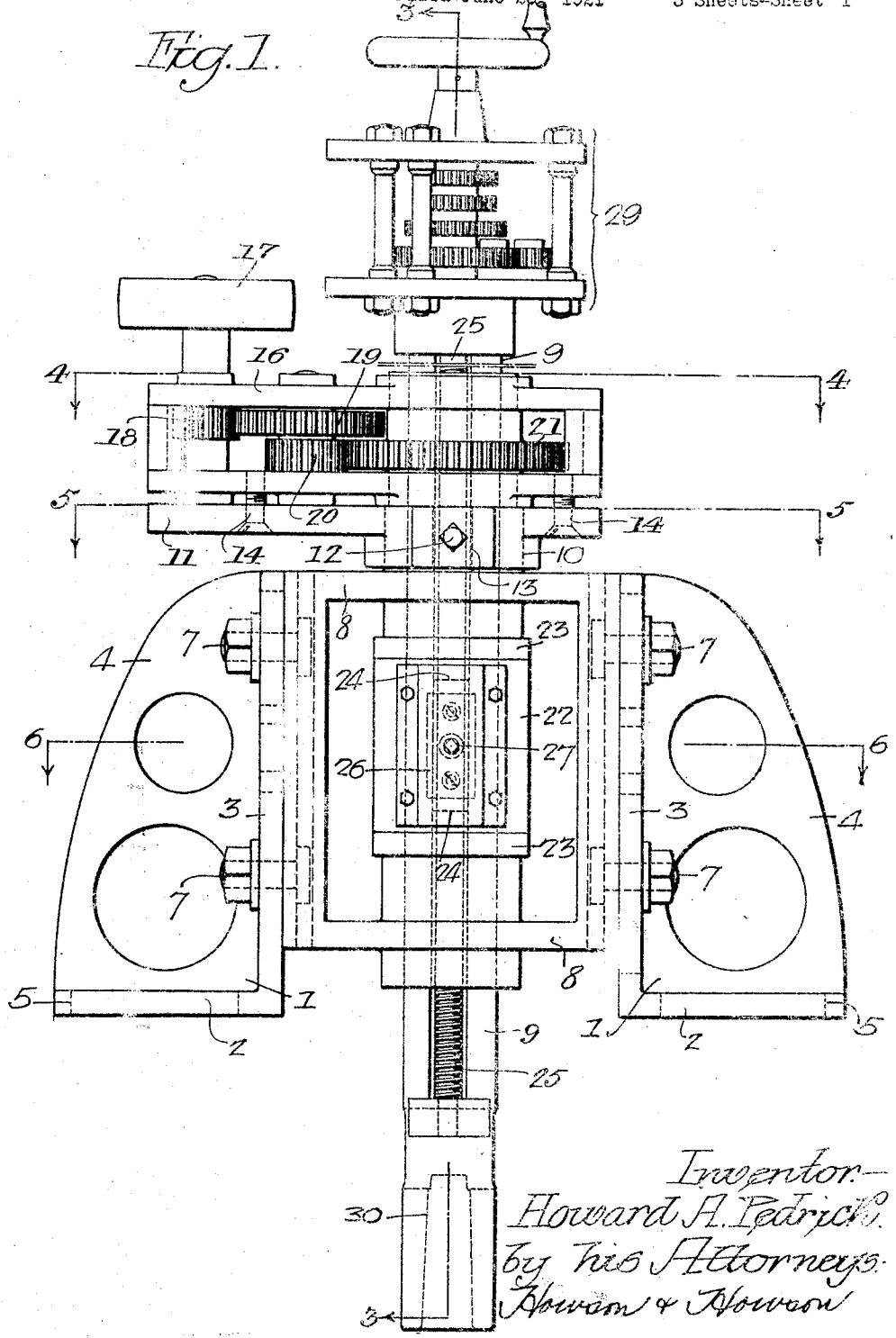

In the above drawings, 1—1 represents a pair of supporting feet each in the form of a casting having two portions 2 and 3 formed with plane external faces and extending at right angles to each other. These two portions are suitably braced by a web 4 and are respectively formed with elongated bolt holes or slots 5 and 6. The first set of these slots, to wit,—those in the portion 2 of each foot, are designed for the reception of suitable bolts whereby my device may be rapidly, though adjustably, connected to or mounted upon a suitable support or object such as the head of a cylinder to be bored, and the slots of the portions 3 are similarly designed to adjustably receive bolts 7 formed with heads slidably mounted in undercut recesses or grooves formed in the opposite sides of a hollow body structure 8.

Said body 8 is preferably, though not necessarily, substantially rectangular in cross section and has its ends or heads formed to provide aligned and relatively elongated bearings for a boring bar 9, which is free to turn as well as slide longitudinally through them. These bearings include suitable bushings of bronze or other bearing material, and one of them is extended as indicated at 10 beyond the outer face of the body for the reception of a plate 11 rotatably mounted upon it, so as to be adjustable about or capable of swinging axially of the boring bar. This plate may be clamped in any given position on said bearing extension 10 by means of a set screw or bolt 12 threaded through it radially of the boring bar and designed to engage a clamping plate 13 as indicated in Figs. 3 and 5.

The supporting plate 11 through suitable means, such as screws 14, is connected to an open frame 16 serving to support or carry a driving pulley 17, suitable spindles, and a train of gears 18—21, of which the first is connected to the shaft carrying said pulley and the last is splined to the boring bar 9. By this means power applied to the driving pulley is transmitted to the boring bar, preferably through the speed-reducing gearing shown, regardless of the position of said bar relatively to the supporting structure 1 and also regardless of the position of the frame 16 and the plate 11 on the bearing extension 10.

Within the body 8, between the two ends or heads thereof, is mounted the device for longitudinally feeding the boring bar when it is rotated. This, in the present instance, consists of a substantially cylindrical sleeve 22 mounted on and substantially concentric with said bar, having thrust rings 23—23 between its ends and the two bearing portions or heads of the body 8. This sleeve is formed with a longitudinally extending slot within which is mounted a block or plate 24 constituting a feed nut having a threaded or ribbed face formed with threads designed to operatively engage the similar threads of a feed screw 25 which extends for practically the entire length of the boring bar in a suitable depression or elongated recess formed therein.

I preferably, although not necessarily, provide a device whereby the feed nut may be moved at will into and out of operative engagement with the feed screw 25 and for this purpose provide a cap 26 mounted on the sleeve 22 over the slot for the feed nut, having threaded through it a bolt 27 whose head is connected to said nut. The construction is such that while said bolt may be rotated to cause it to move longitudinally toward and from the feed screw, its head rotatably engages the nut, so that this is moved radially of said screw into or out of engagement with the same.

In addition to the above described parts, suitable mechanism is provided whereby at will the feed screw 25 may be rotated or held from rotation independently of the boring bar and its speed and direction of rotation varied, but inasmuch as the detail construction of said mechanism forms no part of the present invention, I have not described it in detail.

Under operating conditions a tool-carrying chuck is mounted in a suitable recess 30 in the boring bar, or a cutter may be otherwise mounted thereon, and the supporting structure is mounted adjacent or attached to the object which it is desired to bore or drill, for which purpose suitable bolts are placed in the slots 2 of the legs 1. The body 8 with its attached parts is then moved to bring the boring bar into the desired position, after which the bolts 7 are set up so that said parts are retained in place.

The frame 11—16 with the driving train is then swung about the bearing extension 10 of the body 8 into such a position that the belt from a source of power such as a driving shaft or electric motor, will properly engage the driving pulley 17 with the desired tension. Thereafter the bolt 12 is set up so that said frame 11—16 is retained in place and it is noted that the gear 21 is preferably formed with extended hubs on which the frame 16 is mounted to turn, like the plate 11, concentrically with the boring bar 9.

If now the boring bar be moved longitudinally to bring its cutter into position to operate on a cylinder or other object, power may be applied to the driving pulley so that through the train of gears 18—21, the boring bar is rotated at the desired speed. Obviously the sleeve 22 and feed nut 24 are rotated with the boring bar, together with the feed screw 25 carried by the latter. By means of the mechanism 29 said feed screw may be caused to rotate in either direction relatively to the boring bar, so that the latter by reason of the cooperation of said screw and the feed nut, is caused to move longitudinally and its cutter thereby made to operate as required.

If it be desired to quickly move the boring bar with its cutter longitudinally into or out of operative position, the bolt 27 may be backed off, thereby raising the feed nut 24 out of engagement with the feed screw, whereupon the boring bar 9 may be slid by hand through the body 8, sleeve 22 and driving mechanism. Thereafter by screwing down said bolt, the feed nut 24 may be again brought into operative engagement with the feed screw.

From the above description it will be noted that not only may the device be mounted in any desired position relatively to the structure to be operated on, but it may be quickly and conveniently adjusted for connection with a source of power and that in such manner as to maintain a driving belt at the necessary tension regardless of the relative position of said power source. The apparatus as a whole constitutes a conveniently portable, relatively inexpensive and conveniently adjustable device which is not only of a relatively simple and compact construction but is of such a nature as to permit of its being made in substantial and durable form, suiting it for work on objects of widely varying form and construction.

I claim:

The combination in a boring unit, of a rectangular, hollow body structure; a pair of supporting feet on each side of the said structure; means for adjustably securing the body structure to the said feet; upper and lower bearings in the body structure; a boring bar mounted in the bearings; a feed screw carried by the boring bar; a nut mounted between the bearings of the body structure; means for moving the nut into and out of engagement with the feed screw; a plate pivotally mounted on the upper bearing; means for securing the plate in position; a frame mounted on the plate and carrying the driving mechanism for the boring bar; and means at the upper end of the boring bar for turning the feed screw to move the boring bar longitudinally.

HOWARD A. PEDRICK.